United States Patent
Lin et al.

(10) Patent No.: US 6,491,824 B1
(45) Date of Patent: *Dec. 10, 2002

(54) METHOD FOR PROCESSING RETURNS FROM OIL AND GAS WELLS THAT HAVE BEEN TREATED WITH INTRODUCED FLUIDS

(75) Inventors: Huei-Nan (Leo) Lin, Houston, TX (US); Rodney Davis Martin, Lafayette, LA (US); James M. Brown, Magnolia, TX (US); Gene F. Brock; Randall J. Perkins, both of The Woodlands, TX (US)

(73) Assignee: BJ Services Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/207,786

(22) Filed: Dec. 9, 1998

Related U.S. Application Data (63) Continuation-in-part of application No. 08/984,939, filed on Dec. 4, 1997, now Pat. No. 6,132,619
(60) Provisional application No. 60/032,778, filed on Dec. 5, 1996.

(51) Int. Cl.[7] .................................................. C02F 9/00
(52) U.S. Cl. ........................ 210/666; 210/668; 210/669; 210/693; 210/708; 210/747
(58) Field of Search ................................. 210/663, 666, 210/668, 669, 692, 693, 708, 733, 747

(56) References Cited

U.S. PATENT DOCUMENTS

| | | | |
|---|---|---|---|
| 4,451,377 A | * 5/1984 | Luxemburg | 210/708 |
| 4,818,410 A | 4/1989 | Bellos et al. | 210/639 |
| 4,839,054 A | 6/1989 | Ruebush et al. | 210/639 |
| 4,855,060 A | 8/1989 | Durham et al. | 210/708 |
| 5,021,164 A | 6/1991 | Gay | 210/694 |
| 5,104,545 A | * 4/1992 | Means et al. | 210/650 |
| 5,445,221 A | * 8/1995 | Vinson | 166/279 |
| 5,674,817 A | * 10/1997 | Brezinski et al. | 507/258 |
| 6,132,619 A | * 10/2000 | Lin et al. | 210/662 |

FOREIGN PATENT DOCUMENTS

EP     0 432 787 A1     6/1991

OTHER PUBLICATIONS

European Search Report for EP 90124160.4 dated Jul. 3, 1991.
Summary Bulletin Amberlite® Polymeric Adsorbents, Rohm and Haas Company Technical Bulletin Fluid Process Chemicals, pp. 1–11 (1978).
*Amberlite® XAD–4—Product Description*, Rohm and Haas Company (Jun. 1993).
Simpson, Richard M., *The Separation of Organic Chemicals From Water*, Rohm and Haas Company (Presented at the Third Symposium of the Institute of Advanced Sanitation Research International on Thursday, Apr. 13, 1972).

(List continued on next page.)

*Primary Examiner*—Ivars Cintins
(74) *Attorney, Agent, or Firm*—Howrey Simon Arnold & White, LLP (57) ABSTRACT

A method for resolving sludge/emulsion formed as a result of adding introduced fluids to oil and gas wells. The method comprises adding a water-dispersible emulsion breaker and/or adjunct additives that may include iron-control chemicals, scale-control chemicals, or paraffin-control chemicals or combinations thereof in amounts sufficient to separate the sludge/emulsion into an oil phase and a water phase and to control iron, scale, or paraffin in the oil phase. Further treatment of water phase includes treatment with water clarifiers, allowing the water phase to remain in settling vessels, and passing the water phase through a macroreticular resin resulting in water that is environmentally acceptable for disposal.

35 Claims, 1 Drawing Sheet

OTHER PUBLICATIONS

Treating Oil Field Emulsions, Chapter XI Testing Procedures (Third Edition) by Petroleum Extension Service, The University of Texas at Austin, Texas and American Petroleum Institute, Division of Production, Dallas, Texas (1974).

Gutkowski, Bogdan and Jan Hupka, Microprocessor Controlled Oil/Water Separator, Environment Protection Engineering, vol. 14, No. 3–4 (1988).

Hudgins, Jr., C.M., Chemical Treatments and Usage in Offshore Oil and Gas Production Systems, JPT, pp. 604–611 (May 1992).

Ho, S.V., *A New Membrane Process for Recovering Organics From Aqueous Wastes*, Monsanto Company, St. Louis, MO.

Stephenson, M.T., Components of Produced Water: A Compilation of Industry Studies, JPT, pp. 548–603 (May 1992).

Yadav, B.D., et al., Effectiveness of Induced Air Flotation in Oil Removal From Oilfield Wastewater, Indian Journal Environmental Protection [Kalpana Corporation], vol. 10, No. 11, pp. 820–823 (1990).

Ohlsen, J.R., *Dissolved Organics Removal*, Betz Energy Chemicals, Inc. (Feb. 1990).

Webb, Chris, Separating Oil From Water, The Chemical Engineer, pp. 19–24 (Apr. 11, 1991).

Tugtepe, Mualla and A. Sukru Cagatay, *The Use Of Organosilicon Polymers In Coagulation And Contact Flocculation–Filtration*, Department of Chemical Engineering, Istanbul University, Istanbul, Turkey (Feb. 1989).

Angbo, L., et al., Adsorption Of Humic Substances Onto Prebuilt Flocs, Water Supply, vol. 9, pp. 87–01, (1991).

Holsen, Thomas H, et al. Removal of Sparingly Soluble Organic Chemicals From Aqueous Solutions With Surfactant–Coated Ferrihydrite, Environment Science Technology, vol. 25, No. 9, pp. 1585–1589 (1991).

Bache, D. H., et al. Optimum Coagulation Conditions For A Coloured Water In Terms Of Floc Size, Density And Strength, Water Supply, vol. 9, pp. 93–102 (1991).

Chen, A.S.C., et al., Removal Of Oil, Grease, And Suspended Solids From Produced Water With Ceramic Crossflow Microfiltration, SPE Production Engineering, pp. 131–136 (May 1991).

Kim, Philip H.–S. and James M. Symons, Using Anion Exchange Resins To Remove THM Precursors, Journal AWWA, pp. 61–68 (Dec. 1991).

\* cited by examiner

FIG. 1

METHOD FOR PROCESSING RETURNS FROM OIL AND GAS WELLS THAT HAVE BEEN TREATED WITH INTRODUCED FLUIDS

RELATED APPLICATIONS

This application is a continuation-in-part of U.S. application Ser. No. 08/984,939, filed Dec. 4, 1997, now U.S. Pat. No. 6,132,619, entitled Resolution of Sludge/Emulsion Formed by Acidizing Wells, which claimed the benefit of U.S. Provisional Application No. 60/032,778, filed Dec. 5, 1996.

BACKGROUND OF THE INVENTION

This invention relates to a method for processing returns from oil and gas wells that have been treated with introduced fluids. Introduced fluids commonly used in oil and gas wells include acid stimulation packages, hydraulic fracturing fluids, completion fluids, drilling fluids, and combinations of these.

A. Acid Stimulation Package

Acid stimulation packages are introduced fluids that are designed to remove formation and wellbore damage to improve the productivity of a hydrocarbon producing well. These packages frequently contain acid and other additives. The acid may be mineral acids such as hydrochloric acid or hydrofluoric acid or the acid may be an organic acid such as acetic acid. Combinations of hydrochloric acid and hydrofluoric acid may be used and combinations of mineral acids with organic acids may be used. Other additives that may be present in the acid package include corrosion inhibitors, surfactants, anti-sludging agents, non-emulsifiers, mutual solvents and gelling agents. These additives are present to provide additional properties to the acid package, such as corrosion protection for metal surfaces, improved wettability of formation surfaces, to prevent formation of sludges from the interaction of the acid with the hydrocarbon phase, to prevent emulsions from forming downhole, and to enable the package to be formulated into a stable solution.

B. Hydraulic Fracturing Fluid

Hydraulic fracturing is applied to break down the formation by pumping introduced fluids under high pressure to improve the productivity of the hydrocarbon producing zone. Hydraulic fracturing fluids may contain a variety of additives such as clay stabilizers to prevent clay swelling and fines migration, gelling agents to increase viscosity, proppants to remain in the formation and create a permeable channel in the fracture and other additives as may be required.

C. Completion Fluids

Completion fluids are introduced fluids that are used during final completion operations in drilling a new well. These fluids frequently are weighted brines containing inorganic salts to increase the density of the fluid such as metal salts of halogens, i.e. zinc bromide, calcium chloride, etc. Completion fluids frequently may contain gelling agents to increase viscosity.

D. Drilling Fluids

Drilling fluids are introduced fluids that are used during the drilling process to maintain pressure against the producing formation to prevent blowouts, to transport drill cuttings to the surface and to lubricate and cool the rock drilling bit. These fluids may contain weighting agents, viscosity modifiers, polymeric additives and clay stabilizers. Clays such as bentonite are frequently added to drilling fluids and the fluids are commonly referred to as drilling muds.

Using introduced fluids may cause the formation of sludge/emulsion. Artificial sludge/emulsion formation may be minimal on initial flowback, but as production fluids mix downhole with the introduced fluids, additional sludge/emulsion may be formed. Sludge/emulsion formation may also occur when the introduced fluid flowback is commingled with production from other wells.

If an artificially induced sludge/emulsion problem is not resolved promptly, it will cause a malfunction in the crude oil dehydration treating system. This type of malfunction is commonly referred to as a system upset. A typical crude oil dehydration treating system includes a separator, free water knockout, heater treater or chemelectric, and/or air flotation unit, etc. Crude oil dehydration treating systems are typically used to reduce the basic sediment, and water (BS&W) of crude oil to a certain acceptable level specified by a crude oil purchaser. Crude oil purchasers are often pipeline companies. The level of BS&W typically specified by purchasers is less than 1%.

When a system upset occurs in the treating system two problems occur. First, the required basic silt, sediment, and water level cannot be achieved to meet a purchaser's specifications. Second, high levels of oil and other organic material remain in the resulting water which prevents the resulting water from meeting water quality specifications. The chemicals and systems used for normal oil water separation and processing are not adequate to resolve the sludge/emulsion formed as a result of the use of introduced fluids in oil and gas wells.

To date, the typical method of coping with the possibility of a system upset is to mechanically remove the sludge/emulsion by catching it in large storage tanks. Removal and treatment of sludge/emulsion is a major operational cost for producers. This is particularly true for offshore wells because the sludge/emulsion must be collected, stored, and transported to shore for treatment and disposal.

There is a need for an efficient process to: (1) resolve the sludge/emulsion formed when introduced fluids are added to oil and gas wells; and (2) clean the resulting water sufficiently to meet environmental regulations for disposal. The present invention meets this need.

SUMMARY OF THE INVENTION

One embodiment of the present invention is directed to a method for treating sludge/emulsion formed as a result of treating oil and gas wells with introduced fluids. Introduced fluids include acid stimulation packages, hydraulic fracturing fluids, completion fluids, and drilling fluids either individually or in combination. Sludge/emulsions may be treated by adding one or more adjunct chemicals in combination with an emulsion breaker. The adjunct chemicals may be selected from a group of chemicals consisting of iron-control chemicals, scale-control chemicals, and paraffin-control chemicals. The iron-control chemicals may be selected from a group of chemicals consisting of thioglycolic acid, sodium ethylenediaminetetraacetic acid, potassium ethylenediaminetetraacetic acid, sodium hydroxyethylethylenediaminetetraacetic acid, potassium hydroxyethylethylenediaminetetraacetic acid, sodium nitrilotriacetic acid, potassium nitrilotriacetic acid, sodium bisulfite, ammonium bisulfite, and potassium bisulfite. The scale-control chemicals comprise organic phosphonates, such as hydroxyethylidenediphosphonic acid, aminotri (methylenephosphonic acid), phosphonobutanetricarboxylic acid, phosphoric acid derivatives of polyamines and organic phosphate esters, copolymers containing phosphino groups, polyacrylic acid, copolymers of polyacrylic acid with sulfonated maleic acid and copolymers of polyacrylic acid with sulfonated comonomers. The paraffin-control chemicals may be selected from a group of chemicals consisting of ethylenevinylacetate copolymers, styrene maleic anhydride copolymers, polyacrylic esters of C20 alcohol, dodecylbenzylsulfonic acid, dialkylbenzylsulfonic acid, polyoxyalkylenealkylphenolformaldehyde resins, alkyl acrylates, alkyl methacrylates, alkyl esters, and polyoxyalkylene copolymers.

The emulsion breaker may be water-dispersible and is added to the sludge/emulsion in an amount sufficient to separate the sludge/emulsion into a water phase and an oil phase. The resulting water can be further treated with a water clarifier and then a separation process that comprises prefiltering the water and passing the water through a resin media. The resin media comprises a macroreticular resin. The water clarifier may be added in an amount sufficient to clarify the water to contain less than about 29 milligrams/liter (mg/L) of organic material, a purity adequate for discharge at sea. Such discharge would not create a sheen on the water. The water clarifier may include organic polymers such as polyacrylic acid, acrylic acid based polymers, acrylamide based polymers, polymerized amines, alkanolamines, thiocarbamates cationic polymers or inorganic salts such as alum, aluminum chloride, or aluminum chlorohydrate.

Another embodiment of the invention comprises a sludge/emulsion treatment composition comprising a water-dispersible emulsion breaker and adjunct chemicals comprising iron-control chemicals, scale control chemicals, or paraffin-control chemicals or combinations of iron-control chemicals, scale control chemicals, and paraffin-control chemicals. The iron-control chemicals of the composition comprise thioglycolic acid, sodium ethylenediaminetetraacetic acid, potassium ethylenediaminetetraacetic acid, sodium hydroxyethylethylenediaminetetraacetic acid, potassium hydroxyethylethylenediaminetetraacetic acid, sodium nitrilotriacetic acid, potassium nitrilotriacetic acid, sodium bisulfite, ammonium bisulfite, or potassium bisulfite. The scale-control chemicals comprise organic phosphonates, such as hydroxyethylidienediphosphonic acid, aminotri (methylenephosphonic acid), phosphonobutanetricarboxylic acid, or phosphonic acid derivatives of polyamines, and organic phosphate esters, copolymers containing phosphino groups, polyacrylic acid, copolymers of polyacrylic acid with sulfonated maleic acid and copolymers of polyacrylic acid with sulfonated comonomers. The paraffin-control chemicals comprise ethylenevinylacetate copolymers, styrene maleic anhydride copolymers, polyacrylic esters of C20 alcohol, dodecylbenzylsulfonic acid, dialkylbenzylsulfonic acid, polyoxyalkylenealkylphenolformaldehyde resins, alkyl acrylates, alkyl methacrylates, alkyl esters, or polyoxyalkylene copolymers.

DETAILED DESCRIPTION OF THE INVENTION

The present invention may be used to alleviate at least two problems associated with the formation of sludge/emulsion that is often encountered when introduced fluids such as acid stimulation packages, hydraulic fracturing fluids, completion fluids, and drilling fluids are added to oil and gas wells, either separately or in combination. First, the invention relates to a method for resolving sludge/emulsion sufficiently to enable the resulting oil phase to be combined with the crude oil from the rest of the platform. This can be accomplished by treating the sludge/emulsion with combinations of extremely water-dispersible emulsion breakers and adjunct chemicals. Second, the invention relates to a separation system that can be used to treat the resulting water phase to remove excess organic material from the water. The water phase treatment comprises treating the water separated from returns of introduced fluids with a water clarifier and allowing the clarified water to separate from the skimmings in a settling vessel. The water from the settling vessel is further processed through a prefilter to remove any solids or residual free oil and then is treated by filtration through a macroreticular resin media to remove soluble organic material originating from the stimulation package. The cleaned water may then disposed of by pumping it into a disposal line. This process allows the cleaned water to meet water quality disposal requirements. This process is particularly applicable to oil and gas wells on offshore platforms for which overboard disposal is advantageous.

Addition of Emulsion Breakers and Adjunct Additives

An optimum time to begin adding emulsion breakers and/or adjunct additives is shortly before flowback of introduced fluids begins. Beginning treatment at this production stage reduces the tendency of solids or scale to build-up in sludge/emulsion and removes solids or scale in the production fluid. Adjunct additives may include iron-control chemicals, scale-control chemicals, paraffin-control chemicals or combinations of these chemicals.

Figure 1:
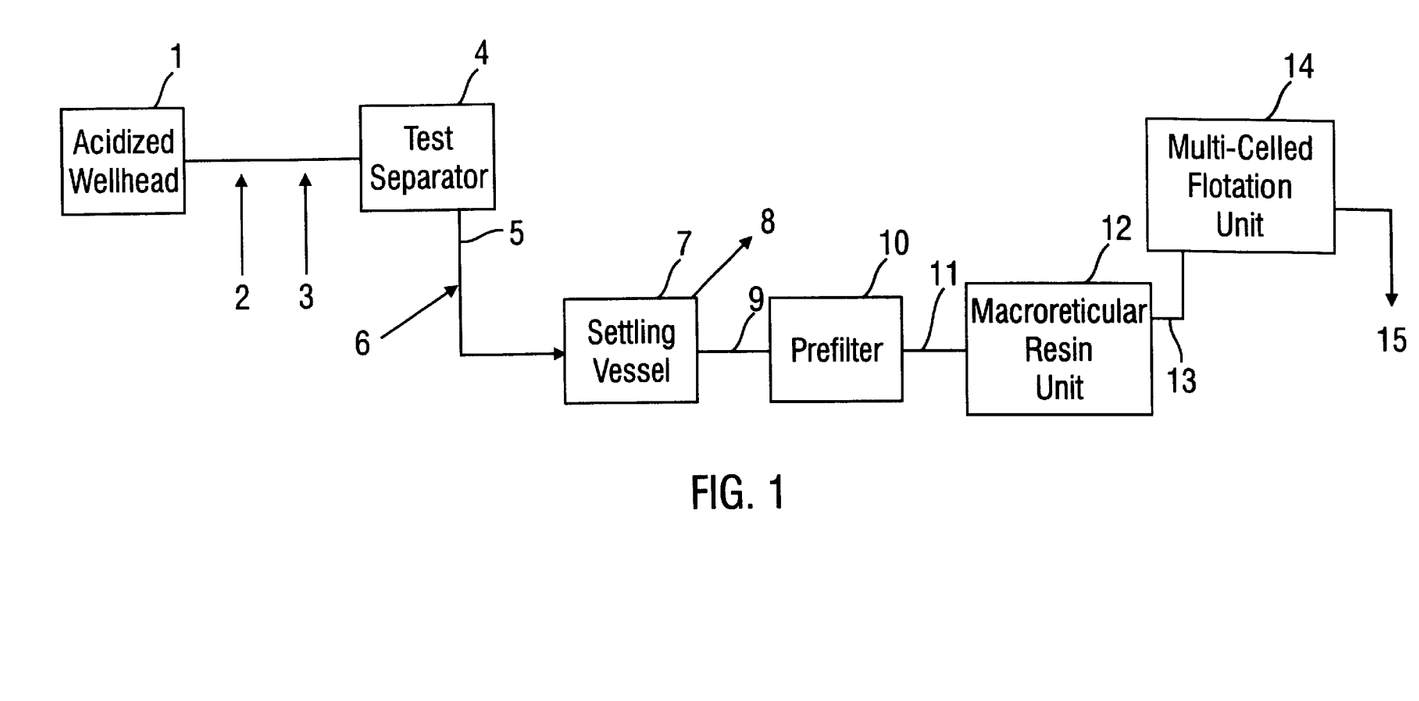
FIG. 1 illustrates a flow chart of an embodiment of the invention.

Referring to FIG. 1, emulsion breakers or adjunct additives or combinations of the two may be added to the sludge/emulsion from a well to which introduced fluids have been used either at the wellhead (as reflected in the acidized well at FIG. 1 to which acid stimulation package has been added to the well) or at points (2) and (3) respectively, before the sludge/emulsion enters the separator vessel (4). Adding additional emulsion breakers, adjunct chemicals, or a water clarifier (6) may be required in some cases to completely resolve the emulsion and produce substantially oil-free water. These may be added in the line (5) leading from the separator (4) to a settling vessel (7). Treatment may include allowing the water and water clarifier to pass through a settling vessel (7) in which the clarified water separates from the skimmings.

Alternatively, emulsion breakers, adjunct chemicals, or combinations of the two may be added down hole, provided the well is equipped with downhole injection equipment. An example of such downhole injection equipment would include capillary tubing attached to the production tubing. The injection of emulsion breakers or adjunct additives or combinations of the two downhole may be commenced upon flowback of introduced fluids.

The Separation Process

Referring to FIG. 1, the water from the settling vessel (7) may be further processed by passing it through a prefilter (10). The water may pass from the settling vessel to the prefilter through a line (9). Prefiltering prevents free oil or solids from fouling a macroreticular resin (12), which may be used for further purification. The water may pass from the prefilter to the macroreticular resin through a line (11). The water is pumped from the settling vessel (7) through the prefilter and then through the macroreticular resin. The macroreticular resin may be contained in a macroreticular resin unit (12).

After passing the water through the macroreticular resin, the treated water may be analyzed to determine if it is of sufficient purity for discharge at sea (15) based on environmental regulatory requirements. Current regulatory standards in the Gulf of Mexico require the treated water to include less than 29 mg/L total oil and grease. The total oil and grease level may be determined by analyzing a sample of the water by the procedure described in Example 5. If the water is not of sufficient purity for discharge into the sea, the water can be pumped into a holding tank and recycled back through the settling vessel, then the prefiltering and macroreticular resin filtering steps may be repeated. This process is repeated until the water is of sufficient purity for discharge into the sea.

Discharge may be accomplished through overboard disposal lines or by entering one of the cells of a multi-celled flotation unit (14) through a line (13). The bulk production from all of the other wells on the offshore platform to which no introduced fluids have been added is treated in the Multi-celled Flotation Unit. Oil and other materials removed from the water may be recirculated (8) in the production system with the oil from the wellhead (1) and treated using conventional methods (not illustrated in FIG. 1). It will be understood that although FIG. 1 illustrates the use of the invention with an acidized well, the invention may be used with other types of introduced fluids or combinations of introduced fluids, such as fracturing fluids, completion fluids and/or drilling fluids.

Emulsion Breakers

Preferred emulsion breakers include dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins. An example of a most preferred water-dispersible emulsion breaker that may be used is a combination of DDBSA and NAXSA.

Emulsion breaker is preferably added either at the wellhead or at a point before or at the separator vessel. The amount of water-dispersible emulsion breaker chemical required to resolve sludge/emulsion is highly dependent upon the amount of oil and water produced by the well, degree of agitation, concentration of chemicals used as introduced fluids, ratio of water soluble polymers to normal production and the iron content in the produced fluid. Typically, about 125 to 5,000 ppm of water-dispersible emulsion breaker to total produced fluid is used. By way of example, the initial treatment of the water-dispersible emulsion breaker may be estimated at 250 ppm, and thereafter the amount of water-dispersible emulsion breaker may be adjusted based on a determination of BS&W from a sample taken from the test separator (FIG. 1, item 4). If the BS&W determination is greater than desired, more emulsion breaker is added at (3). The determination of BS&W may be made based on the methods presented in Example 6.

Adjunct Additives

Adjunct additives include iron-control chemical additives, scale-control chemical additives, and paraffin-control chemical additives.

E. Iron-Control Chemicals

Iron-control chemicals prevent the formation of particulate insoluble iron salts by complexing or chelating ferrous iron or reducing ferric iron to ferrous iron. Iron-control chemicals also prevent the oxidation of ferrous to ferric iron. Ferrous iron is commonly found in sludge/emulsion formed from oil and gas wells to which introduced fluids have been added. Iron in the sludge/emulsion is believed to come from naturally occurring iron in the subterranean formation or from iron in tubular goods used in the drilling and/or production of the well. Iron-control chemicals enable emulsion breakers to resolve sludge/emulsion more promptly than with conventional methods by converting ferric iron to ferrous iron or preventing the formation of ferric iron. In aqueous solution, ferric iron is insoluble and aggravates resolution of the sludge/emulsion.

Preferred iron-control chemicals include thioglycolic acid. Other preferred iron-control chemicals include chelating agents such as sodium or potassium salts of ethylenediaminetetraacetic acid (EDTA), sodium or potassium salts of hydroxyethylethylenediaminetetraacetic acid (HEEDTA), or sodium or potassium salts of nitrilotriacetic acid (NTA) and salts containing bisulfite ions such as sodium bisulfite, ammonium bisulfite, potassium bisulfite.

The amount of iron-control chemical that is required to resolve sludge/emulsion is dependent on the amount of ferrous and ferric iron present in the total production fluid, but may range from about 500 to about 10,000 ppm of iron-control chemical. The higher the total iron content, the more iron-control chemical required. By way of example, the initial treatment of the iron-control chemical may be estimated at 1000 ppm and thereafter, the amount of iron-control chemical may be adjusted based on a determination of BS&W from a sample taken at the test separator (FIG. 1, item 4). If the BS&W determination is greater than desired, more iron-control chemical may be added at (2). The determination of BS&W may be based on the methods presented in Example 6.

F. Scale-Control Chemicals

When the scaling potential indicates that scale formation is possible, a scale inhibitor may be added. The higher the scaling potential, the more scale-control chemical required. By way of example, the initial treatment of scale-control chemical may be estimated at about 1 to 100 ppm. Preferred scale control additives include organic phosphonates, such as hydroxyethylidienediphosphonic acid, aminotri (methylenephosphonic acid), phosphonobutanetricarboxylic acid, or phosphonic acid derivatives of polyamines, and organic phosphate esters, copolymers containing phosphino groups, polyacrylic acid, copolymers of polyacrylic acid with sulfonated maleic acid and copolymers of polyacrylic acid with sulfonated comonomers.

The determination of whether to add scale-control chemical and the amount of scale control chemical to add is based on a determination of the scaling potential of the water phase of the sludge/emulsion. Scaling potential may be determined by any methods known by one of ordinary skill in the art. Preferred methods to determine scaling potential include use of software programs based on solubility parameter analysis. A preferred solubility parameter analysis program is Downhole SAT™, which is commercially available from French Creek Software Inc. of Kimberton, Pa. 19442.

G. Paraffin-Control Chemicals

Paraffin-control chemicals may be added to control the formation of paraffin in the production fluid. The higher the total paraffin content of the production fluid, the more paraffin-control chemical required. By way of example, the initial treatment of the paraffin-control chemical may be estimated at about 1 to about 100 ppm. Preferred paraffin-control chemical additives include: ethylenevinylacetate copolymers, styrene maleic anhydride copolymers, poly (acrylic esters of C20 alcohol), dodecylbenzylsulfonic acid, dialkylbenzylsulfonic acid, polyoxyalkylenealkylphenol-formaldehyde resins, alkyl acrylates, alkyl methacrylates, alkyl esters, and polyoxyalkylene copolymers.

The amount of paraffin-control chemical that is required to resolve sludge/emulsion is dependent on the amount of paraffin present in the total production fluid. This may be determined by any method known to one of ordinary skill in the art. One preferred method to determine the paraffin content of production fluid is the "Standard Test Method for Pour Point of Petroleum oils," which is the ASTM D 97-87 standard. A second preferred method for determining the paraffin content of production fluids is the "Cold Finger Test," which is described herein at Example 7 and at page 115 of CRUDE OIL, WAXES, EMULSIONS AND ASPHALTENES by J. R. Becker, published by PennWell Publishing Co. in Tulsa, Okla. These methods may be used to determine whether paraffin precipitation will be a potential problem on flowback and to screen paraffin-control chemicals to identify the appropriate paraffin-control chemical and the proper dosing rate for the paraffin precipitation of the sample. One of ordinary skill in the art can make these determinations based on the tests identified herein.

Water Clarifiers

Water that is separated from sludge/emulsion may be treated with about 1000 to about 100,000 ppm of water clarifier, most preferably a high molecular weight partially crosslinked polyacrylic acid of nominal molecular weight of 2,000,000 to 3,000,000 daltons in an oil external emulsion. By way of example, the initial amount of the water clarifier may be estimated at 5,000 ppm, and thereafter the amount of clarifier may be adjusted based on testing methods described in Example 3. Preferred water clarifiers include inorganic metal salts such as alum, aluminum chloride, and aluminum chlorohydrate or organic polymers such as acrylic acid based polymers, acrylamide based polymers, polymerized amines, alkanolamines, thiocarbamates, and cationic polymers such as diallyldimethylammonium chloride (DADMAC).

Prefiltering

Prefiltering prevents free oil or solids from fouling a macroreticular resin, which may be used for further purification. Any prefilter commonly used in the industry may be used including a cotton or synthetic cloth membrane filter of nominal 10 micron pore size. After prefiltering, the water may be treated by passing it through a macroreticular resin media.

Macroreticular Resins

The macroreticular resin media removes soluble organic material that may have been present in the water phase such as corrosion inhibitors, mutual solvents, and surfactants that may be added to the introduced fluid during stimulation as well as naturally occurring soluble organic compounds and insoluble hydrocarbons. Macroreticular resin media are polymeric adsorbents which are hard polymerized insoluble copolymer beads that have high porosity and high surface area. A preferred macroreticular resin media is Amberlite XAD series available commercially from Rohm and Haas. Macroreticular resin media is reusable and regenerable on site. Another commonly used adsorbent for treating water to remove organic compounds is granulated activated carbon, but granulated activated carbon cannot be as easily regenerated after use as macroreticular resin.

The following examples will illustrate the invention, but should not be construed to limit the scope thereof unless otherwise expressly noted.

EXAMPLE 1

RESIN TESTING OF WATER PHASE WITHOUT CHEMICAL TREATMENT

Fifteen ml. of Amberlite XAD-2 (20–60 mesh) macroreticular resin was placed into a 30 ml. plastic syringe with a small tuft of glass wool in the bottom and top. Approximately 10 ml. of distilled water was passed through the resin prior to use.

Samples were taken from a wellhead during acid flow back and placed into a 2 liter container. The samples were allowed to settle for 15 minutes. A water sample was taken from the bottom of the settling vessel. The organic content of the water sample was measured by taking an infrared (IR) reading of a freon extract of the water sample. The reading was 381 ppm oil and grease Fifty ml. of this sample was allowed to flow through the resin in the syringe and then a second organic content measurement was taken by IR reading of a freon extract. The second reading was 322 ppm oil and grease. This example demonstrates that passing water containing high amounts of soluble and insoluble organic materials through macroreticular resin lowers the organic content of the water.

EXAMPLE 2

WATER CLARIFIER TESTING OF WATER WITH CHEMICAL TREATMENT

Three liters of wellhead emulsion was combined with 5000 ppm of thioglycolic acid and 2500 ppm of a mixture containing DDBSA and NAXSA and allowed to settle in a separatory funnel. The oil layer was clean and bright and contained less than 0.5% basic silt, sediment, and water. Samples of the water layer were taken from the bottom of the separatory funnel and were combined with 10,000 and 5000 ppm of a high molecular crosslinked polyacrylic acid (A), and a high molecular weight non-crosslinked polyacrylic acid (B). The results were:

| | |
|---|---|
| 10,000 ppm A | clean, fast break |
| 5,000 ppm A | slower, not as clean as above |
| 10,000 ppm B | slow, clean looser floc |

The water that seperated from the emulsion was chocolate brown in color. After the chocolate brown water was clarified with 10,000 ppm of polyacrylic acid, a thick floc developed which floated to the top leaving clear water below. This example demonstrates successful treatment of an emulsion sample from an acidized well flowback to yield acceptable oil quality and further successful treatment of the water layer to yield relatively clean water.

EXAMPLE 3

RESIN TESTING WITH CHEMICAL TREATMENT AND CLARIFICATION

A fresh sample of wellhead emulsion was combined with thioglycolic acid and a mixture of DDBSA and NAXSA as in the previous example. The water that subsequently separated was combined with 10,000 ppm of a high molecular crosslinked polyacrylic acid (A). The clarified water was then allowed to flow through a macroreticular resin and the organic content of the water was measured.

| Cumulative Volume Through Resin (ml) | Organic Content (ppm) |
|---|---|
| 0 (blank) | 103 |
| 50 | 59 |
| 190 | 59 |
| 250 | 37 |
| 410 | 44 |
| 590 | 37 |
| 830 | 52 |
| Fifty ml. of unclarified water was allowed to flow through a macroreticular resin to increase resin loading followed by 50 ml. of clarified water. (The resin was purposely fouled in this step to determine what the capacity of the resin was.) | |
| 930 | 52 |
| Fifty ml. of unclarified water was allowed to flow through a macroreticular resin to increase resin loading followed by passing 50 ml. of clarified water through the macroreticular resin. | |
| 1030 | 52 |

At the completion of this experiment, the resin bed was dirty brownish yellow in color. Fifty ml. of denatured alcohol was passed through the resin. The resin returned to its original white color and the effluent was highly colored and turbid. One hundred ml. of distilled water was flushed through the resin and another 50 ml. sample of clarified water was passed. The organic content of the clarified water after passing it through the macroreticular resin was 55 ppm.

The denatured alcohol was passed through the resin bed to regenerate the resin and return it to a clean state. The alcohol dissolved the captured organics from the resin and eluted as a dark viscous liquid. The resin turned from a dirty brown color to its original white color. This example demonstrates that passing water that has been separated from an acid flowback emulsion through a macroreticular resin can significantly reduce the organic content of the water even after it has been clarified with a polymeric clarifier.

EXAMPLE 4

OFFSHORE TREATMENT OF PRODUCED FLUIDS AFTER ACIDIZING OF MULTIPLE WELLS

Produced fluids from three wells that had been acidized were combined with an iron-control agent (thioglycolic acid) and a water-dispersible emulsion breaker containing a mixture of DDBSA and NAXSA. The iron-control agents and emulsion breakers were added into the combined stream from the three wells upstream from a separation vessel. The oil taken off of the top of the separator contained less than 0.5% basic silt, sediment and water and could be combined with the remainder of the production from the offshore platform in the bulk oil treater.

The water from the bottom of the separation vessel was measured for total organic content by IR and found to contain from 900 to 974 ppm of organics. The pH of the water phase was less than 1.0 as measure by pH indicator paper. The water was combined with approximately 1000 ppm of polyacrylic acid as it exited the separation vessel and was allowed to flow into the top of a 50 bbl tank. The water was allowed to flow out of the bottom of the 50 bbl tank through a 10 micron polyester cartridge prefilter and into a process tower containing macroreticular resin. The water exiting the 50 bbl tank contained an average organic level of 120 ppm and the water exiting the macroreticular resin process tower contained 12 to 16 ppm total organic level measured by IR. This water was suitable for overboard discharge and was allowed to flow into the terminal cell of a multiple cell flotation unit and then overboard.

EXAMPLE 5

TEST TO DETERMINE WHETHER WASTE WATER IS OF SUFFICIENT QUALITY TO BE DISPOSED OFFSHORE

1. Scope and Application
1.1 This method includes the measurement of fluorocarbon-113 extractable matter from surface and saline waters, industrial and domestic wastes. It is applicable to the determination of hydrocarbons, vegetable oils, animal fats, waxes, soaps, greases and related matter.
1.2 The method is applicable to measurement of most light petroleum fuels, although loss of about half of any gasoline present during the extraction manipulations can be expected.
1.3 The method covers the range from 0.2 to 1000 mg/l of extractable material.
1.4 While this method can be used to obtain an estimate of the oil and grease that would be measured gravimetrically, in many cases the estimate more accurately describes the parameter, as it will measure volatiles more effectively and is not susceptible to interferences such as extractable sulfur. It can be used with the Petroleum Hydrocarbon procedure to obtain an oil and grease value and a petroleum hydrocarbon value on the same sample.
2. Summary of Method
2.1 The sample is acidified to a low pH (<2) and extracted with fluorocarbon-113. The oil and grease is determined by comparison of the infrared absorbance of the sample extract with standards.
3. Definitions
3.1 The definition of oil and grease is based on the procedure used. The source of the oil and/or grease, and the presence of extractable non-oily matter will influence the material measured and interpretation of results.
4. Sampling and Storage
4.1 A representative sample of 1 liter volume should be collected in a glass bottle. If analysis is to be delayed for more than a few hours, the sample is preserved by the addition of 5 ml HCl (6.1) at the time of collection and refrigerated at 4° C.
4.2 Because losses of grease will occur on sampling equipment, the collection of a composite sample is impractical. Individual portions collected at prescribed time intervals must be analyzed separately to obtain the average concentration over an extended period.
5. Apparatus
5.1 Separatory funnel, 2000 ml, with Teflon stopcock.
5.2 Infrared spectrophotometer, scanning. Non-scanning instruments may also be used but can be subject to positive interferences in complex chemical waste waters.
5.3 Cells, 10 mm, 50 mm, and 100 mm path length, sodium chloride or infrared grade glass.
5.4 Filter paper, Whatman No. 40, 11 cm.
6. Reagents
6.1 Hydrochloric acid, 1:1. Mix equal volumes of conc. HCl and distilled water.
6.2 Fluorocarbon-113, (1,1,2-trichloro-1,2,2-trifluoroethane), b. p. 48° C.
6.3 Sodium sulfate, anhydrous crystal.

6.4 Calibration mixtures:
6.4.1 Reference oil: Pipet 15.0 ml n-hexadecane, 15.0 ml isooctane, and 10.0 ml chlorobenzene into a 50 ml glass stoppered bottle. Maintain the integrity of the mixture by keeping stoppered except when withdrawing aliquots.
6.4.2 Stock standard: Pipet 1.0 mil reference oil (6.4.1) into a tared 200 ml volumetric flask and immediately stopper. Weigh and dilute to volume with fluorocarbon-113.
6.4.3 Working standards: Pipet appropriate volumes of stock standard (6.4.2) into 100 ml volumetric flasks according to the cell path length to be used. Dilute to volume with fluorocarbon-113. Calculate concentration of standards from the stock standard.

7. Procedure 7.1 Mark the sample bottle at the water meniscus for later determination of sample volume. If the sample was not acidified at time of collection, add 5 ml hydrochloric acid (6.1) to the sample bottle. After mixing the sample, check the pH by touching pH-sensitive paper to the cap to insure that the pH is 2 or lower. Add more acid if necessary.

7.2 Pour the sample into a separatory funnel.

7.3 Add 30 ml fluorocarbon-113 (6.2) to the sample bottle and rotate the bottle to rinse the sides. Transfer the solvent into the separatory funnel. Extract by shaking vigorously for 2 minutes. Allow the layers to separate.

7.4 Filter the solvent layer into a 100 ml volumetric flask through a funnel containing solvent-moistened filter paper.
NOTE: An emulsion that fails to dissipate can be broken by pouring about 1 g sodium sulfate (6.3) into the filter paper cone and slowly draining the emulsion through the salt. Additional 1 g portions can be added to the cone as required.

7.5 Repeat (7.3 and 7.4) twice more with 30 ml portions of fresh solvent, combining all solvent in the volumetric flask.

7.6 Rinse the tip of the separatory funnel, filter paper, and the funnel with a total of 5–10 ml fluorocarbon-113 and collect the rinses in the flask. Dilute the extract to 100 ml, and stopper the flask.

7.7 Select appropriate working standards and cell pathlength according to the following table of approximate working ranges:

| Pathlength | Range |
|---|---|
| 10 mm | 2–40 mg |
| 50 mm | 0.4–8 mg |
| 100 mm | 0.1–4 mg |

7.8 Scan standards and samples form 3200 $cm^{-1}$ to 2700 $cm^{-1}$ with fluorocarbon-113 in the reference beam and record the results on absorbance paper. The absorbances of samples and standards are measured by constructing a straight baseline over the range of the scan and measuring the absorbance of the peak maximum at 2930 $cm^{-1}$ and subtracting the baseline absorbance at that point. For an example of a typical oil spectrum and baseline construction, see Gruenfeld [3]. Non-scanning instruments should be operated according to manufacturer's instructions, although calibration must be performed using the standards described above (6.4). If the absorbance exceeds 0.8 for a sample, select a shorter pathlength or dilute as required.

7.9 Use a calibration plot of absorbance vs. mg oil prepared from the standards to determine the mg oil in the sample solution.

8. Calculation $$\text{mg/l total oil and grease} = \frac{R \times D}{V}$$

where:
R=oil in solution, determined from calibration plot, in milligrams.
D=extract dilution factor, if used.
V=volume of sample, determined by refilling sample bottle to calibration line and correcting for acid addition if necessary, in liters.

9. Precision and Accuracy 9.1 The two oil and grease methods in this manual were tested by a single laboratory (EMSL) on sewage. This method determined the oil and grease level in the sewage to be 17.5 mg/l. When 1 liter portions of the sewage were dosed with 14.0 mg of a mixture of #2 fuel oil and Wesson oil, the recovery was 99% with a standard deviation of +1.4 mg/l.

Bibliography

1. Standard Methods for the Examination of Water and Wastewater, 14th Edition, p. 516, Method 502B (1975).
2. American Petroleum Institute, "Manual on Disposal of Refinery Wastes," Vol. IV, Method 733–58 (1958).
3. Gruenfeld, M., "Extraction of Dispersed Oils from Water for Quantitative Analysis by Infrared Spectroscopy," Environ, Sci. Technol. 7,636 (1973).

EXAMPLE 6

TEST TO DETERMINE BS&W

After a representative sample has been obtained, the next operation is to determine the percent of water and sediment present. The following three testing methods, as described in this chapter, are paraphrased or quoted from API Standard: 2542, *Standard Method of Test for Water and Sediment in Crude Oils.*

1. Laboratory centrifuge method.
2. Field centrifuge method.
3. Field centrifuge method, 12.50-ml tube.

The API Standard also mentions the base method and gravity settling method.

It is generally agreed that the laboratory centrifuge method is the most accurate, but the field centrifuge method is usually employed when laboratory facilities are not available. The gravity settling method is less generally used, although it is employed in some areas. The base method is used when agreement cannot be reached between the buyer and seller using any of the other methods. The base method is also considered to be the standard and method of testing for crude oils that have characteristics not suitable for testing by the centrifuge method because it does not use centrifuges. The base method is employed in accordance with ASTM Method D95—API Standard: 2560, *Test for Water in Petroleum Products and Other Bituminous Materials* and ASTM Method D473—API Standard: 2561, *Test for Sediment in Crude and Fuel Oils by Extraction.*

Field Centrifuge Method

A centrifuge should be capable of whirling two or more filled centrifuge tubes at a speed that can be controlled to give a relative centrifugal force of between 500 and 800 at the tip of the tubes. The revolving head, trunnion rings, and trunnion cups, including the cushion, should be soundly enough constructed to withstand the maximum centrifugal force capable of being delivered by the power source. The trunnion cups and cushions should firmly support the tubes when the centrifuge is in motion. The centrifuge should be enclosed by a metal shield or case strong enough to eliminate danger if any breakage occurs.

The speed of the rotating head is calculated by use of the following formula:

$$rpm = 25\sqrt{\frac{rcf}{d}}$$

where: $rpm$ = revolutions per minute $rcf$ = relative centrifugal force $d$ = diameter of swing in inches measured between the tips of opposite tubes when in rotating position.

The centrifuge tubes are 8 inches long, cone-shaped, and made of thoroughly annealed glass. While the use of the 8-inch tube is preferable, a cone-shaped 6-inch tube may be used. In both types, the graduations are numbered and should be clear and distinct. The mouth should be constricted in shape for closure with a cork. Scale error tolerances and smallest graduations between various calibration marks are given in table 4 for 8-inch tubes and in table 5 for 6-inch tubes. The tolerances apply to calibrations made with air-free water at 20° C., reading the bottom of a shaded meniscus. A pear-shaped centrifuge tube may also be used. Its specifications are similar to those of the 8-inch and 6-inch tubes as to material and tolerances.

When mutually agreeable, centrifuge tubes graduated in 200 parts and marked for direct reading in percent water and sediment may be used. They may be 6-inch tubes, either cone- or pear-shaped. These tubes are only used for testing with equal parts of solvent and oil.

TABLE 4

CALIBRATION TOLERANCES OF 8-INCH TUBES

| Range (ml) | Subdivision (ml) | Volume tolerance (ml) |
| --- | --- | --- |
| 0.0 to 0.1 | 0.05 | ±0.02 |
| 0.1 to 0.3 | 0.05 | ±0.03 |
| 0.3 to 0.5 | 0.05 | ±0.05 |
| 0.5 to 1.0 | 0.10 | ±0.05 |
| 1.0 to 2.0 | 0.10 | ±0.10 |
| 2.0 to 3.0 | 0.20 | ±0.10 |
| 3.0 to 5.0 | 0.50 | ±0.20 |
| 5.0 to 10 | 1.00 | ±0.50 |
| 10 to 25 | 5.00 | ±1.00 |
| 25 to 100 | 25.00 | ±1.00 |

TABLE 5

CALIBRATION TOLERANCES OF 6-INCH TUBES

| Range (ml) | Subdivision (ml) | Volume tolerance (ml) |
| --- | --- | --- |
| 0.0 to 0.1 | 0.05 | ±0.020 |
| 0.1 to 0.3 | 0.05 | ±0.030 |
| 0.3 to 0.5 | 0.05 | ±0.050 |
| 0.5 to 1.0 | 0.10 | ±0.075 |
| 1.0 to 1.5 | 0.10 | ±0.100 |
| 1.5 to 2.0 | 0.10 | ±0.200 |
| 2 to 3 | 0.20 | ±0.300 |
| 3 to 5 | 0.50 | ±0.500 |
| 5 to 10 | 1.00 | ±0.750 |
| 10 to 25 | 5.00 | ±1.000 |
| At 50, 75 and 100 | . . . | ±1.500 |

The following solvents and demulsifiers are considered satisfactory for field testing:

Solvents
  Stoddard solvent
  Toluene
  Xylene
  Kerosine
  While gasoline
Demulsifiers
  Commercial crude oil demulsifiers
  Phenol
  Nitrogen bases
  Naphthenic acids Toluene and xylene should be saturated with water at ambient of room temperature but should be free of suspended water. Solvents are toxic and care should be exercised in suing them. Gasoline containing tetraethyl lead or deicer should never be used. When Stoddard solvent, kerosine, or white gasoline are used, they must have solvent characteristics similar to those of the crude oil being tested.

The use of a demulsifier with solvents is permitted, subject to the mutual consent of all parties concerned, when tests demonstrate that correct results cannot otherwise be determined. The type and concentration is not limited, provided the demulsifier itself does not contribute to the water and sediment. Commercial demulsifiers at a concentration of 7 ml per 1,000 ml of solvent have been successfully used.

Procedure. Fill the centrifuge tube to the 50-ml mark with solvent, then pour the well-shaken sample directly from the container into the tube until the total volume is 100 ml. Stopper the tube and shake until the contents are thoroughly mixed. Immerse the tube in a bath or dry heating device and heat the contents of the tube to 120° F. Where field conditions do not permit the use of sensitive temperature control devices, pocket-type thermometers may be used. In such cases, every effort should be made to insure a reasonably consistent bath temperature for the same oil each time it is tested.

If wax contributes to the volume of water and sediment observed, preheat the oil-solvent mixture to 140° F. before each whirling; the final temperature of the mixture should not drop below 115° F. A heated centrifuge may be required to maintain a final temperature of 115° F.

Invert the tube to assure that the oil and solvent are uniformly mixed. If shaking is necessary, proceed cautiously because the vapor pressure at 140° F. is approximately double that at 100° F. Place the tubes in the trunnion cups on opposite sides of the centrifuge to establish a balanced condition, and whirl for 3 to 10 minutes, depending on the character of the sample. The cups should be whirled at a rate, calculated from the formula, that is sufficient to produce a relative centrifugal force of between 500 and 800 at the tip of the whirling tubes (see table 6).

TABLE 6

ROTATION SPEEDS APPLICABLE FOR CENTRIFUGES OF VARIOUS DIAMETERS

| Diameter of swing in inches* | Rpm at 500 rcf | Rpm at 700 rcf |
|---|---|---|
| 12 | 1,710 | 2,030 |
| 13 | 1,650 | 1,950 |
| 14 | 1,590 | 1,880 |
| 15 | 1,530 | 1,840 |
| 16 | 1,480 | 1,760 |
| 17 | 1,440 | 1,700 |
| 18 | 1,400 | 1,660 |
| 19 | 1,360 | 1,610 |
| 20 | 1,330 | 1,570 |
| 21 | 1,300 | 1,530 |
| 22 | 1,270 | 1,500 |
| 23 | 1,240 | 1,460 |
| 24 | 1,210 | 1,430 |

*Measured in inches between tips of opposite tubes when in rotating position.

Read and record the combined volume of water and sediment at the bottom of the tube to the nearest 0.05 ml from 0.1 to the 1-ml graduation and to the nearest 0.1 above the 1-ml graduation. Below 0.1 ml, estimate to the nearest 0.025 ml. If experience with the oil is limited, it is advisable to return the tube to the centrifuge without agitation and repeat the operation.

With certain types of oil, it is difficult to obtain a clean break between the oil layer and the seperated water. In such cases, one or more of the following remedies may be effective:

1. Raise the temperature to 140° F.
2. Shake the mixture between whirlings in the centrifuge just sufficiently to disperse the emulsion
3. Use a different or increased amount of demulsifier, but one that does contribute to the water and sediment.
4. Use a different or increased amount of solvent.

After a satisfactory procedure for a particular type of oil has been worked out, it ordinarily is found suitable for all samples of the same type.

Calculation. Multiply the reading obtained from the graduation on the tube by two, and record the results as the percentage of water and sediment. For example, if a reading is 0.025 ml, record the percentage of water and sediment as 0.05. If a reading is 0.15 ml, record the percentage of water and sediment as 0.3. If the results are lower than 0.05 percent, record the percentage of water and sediment as either 0 or 0.05, whichever is closer.

Record. The record shall include the following:

1. the percentage of water and sediment;
2. the solvent used;
3. the type and amount of demulsifier, if used; and
4. the bath temperature.

Field Centrifuge Method, 12.50-ml Tube

This method of testing, using 12.50-ml, 100 percent centrifuge tubes for use in the determination of water and sediment in crude oil, is employed in some areas of the United States. Either a hand-powered or electrically powered centrifuge is used. Capacity, dimensions, graduations, tolerances, and markings are shown in tables 7, 8 and 9.

Molded tubes are preferred, but blown tubes, if they comply with the stipulations on uniform wall thickness, are satisfactory. All centrifuge tubes should be retempered to remove manufacturing strains. The lower end of the centrifuge tube must be clear and perfectly rounded inside, with the same thickness of glass as the main body of the tube. The solvents and demulsifiers to be used in this method are the same as those give in the 100-ml field sampling method.

Procedure. Fill two tubes to the 50 percent mark with solvent, with or without demulsifier, and then to the 100 percent mark with the oil to be tested. Stopper the tubes, shake until the contents are thoroughly mixed, place them in the centrifuge, and revolve at the rate of 1,500 revolutions per minute for 3 to 10 minutes, depending on the sample. Remove the tubes, and record the combined volume of water and sediment in each tube to the nearest 0.1 percent.

TABLE 7

CAPACITY OF 12.5-ml CENTRIFUGE TUBE

| Indicated percentage | Milliliters |
|---|---|
| 1 | 0.125 |
| 2 | 0.250 |
| 3 | 0.375 |
| 5 | 0.625 |
| 10 | 1.250 |
| 15 | 1.875 |
| 20 | 2.500 |
| 25 | 3.125 |
| 30 | 3.750 |
| 35 | 4.375 |
| 40 | 5.000 |
| 45 | 5.625 |
| 50 | 6.250 |
| 100 | 12.500 |

TABLE 8

SPECIFICATIONS FOR 12.50-ml CENTRIFUGE TUBE

Graduations
Graduations shall be marked as follows:

| 0 to 3 percent | 0.2 of 1 percent |
| 3 to 10 percent | 0.5 of 1 percent |
| 10 to 50 percent | 1 percent |
| 50 to 100 percent | blank |

Specifications

Length, overall: 118 ± 2 mm
Length, 0 to 50 percent: 66 ± 4 mm
Length, 50 to 100 percent: 35 ± 3 mm
Length, tapered part: 56 to 62 mm
Length, untapered part: 58 to 60 mm
Rim thickness: 2 to 3 mm, included in overall measurement
Diameter, untapered: 17 ± 0.25 mm
Diameter, bottom, at the 0.3 percent marking: 5 ± 1 mm
Normal thickness: perfect semicircle bottom

TABLE 9

TOLERANCES FOR 12.50 ml TUBE

| Range (percent) | Tolerance (percent) | Volumetric capacity (ml) |
|---|---|---|
| 0 to 1 | ±0.10 | ±0.0125 |
| 1 to 2 | ±0.15 | ±0.0188 |

TABLE 9-continued

TOLERANCES FOR 12.50 ml TUBE

| Range (percent) | Tolerance (percent) | Volumetric capacity (ml) |
|---|---|---|
| 2 to 3 | ±0.20 | ±0.0250 |
| 3 to 5 | ±0.20 | ±0.0250 |
| 5 to 10 | ±0.40 | ±0.0500 |
| 10 to 25 | ±0.50 | ±0.0625 |
| 25 to 50 | ±1.00 | ±0.1250 |
| 50 to 100 | ±1.00 | ±0.1250 |

Replace the tubes in the centrifuge and revolve again for from 3 to 10 minutes. Again record the combined water and sediment. If there is a difference of more than 0.2 percent between the first and second readings, continue centrifuging until two consecutive readings check within 0.2 percent.

Calculation. The sum of the final readings on the two 12.50-ml centrifuge tubes represents the volume percentage of water and sediment in the crude oil tested.

Report. The report shall include the following:
1. the percentage of water and sediment;
2. the solvent used; and
3. the type and amount of demulsifier, if used.

Material taken from "Treating Oil Field Emulsions," Third Edition issued by Petroleum Extension Service, The University of Texas at Austin, Austin, Texas and American Petroleum Institute, Division of Production, Dallas, Tex. 1974.

EXAMPLE 7

COLD-FINGER TESTING

Cold-finger tests have been devised to answer some of the questions about the conditions of temperatures at which deposits form. These tests are often performed using equipment designs that range from quite simple to very elaborate. The basic concept of these tests is that a surface (cold finger) is placed in a sample of heated crude oil, and cooling fluid (provided by a thermostatically controlled circulating heating and cooling bath) is circulated through the interior of the cold finger.

The oil is gently agitated about the cold finger with a magnetic stirrer while the oil is maintained at a temperature above its cloud point, and deposits form on the cold finger's surface. The amount of deposit collected after the test has been run is a measure of the problems the field will experience with the oil. The duration of the test can range from 3–10 hours and is highly dependent upon the individuals conducting the test.

The extent to which conditions of pressure and temperature are controlled determine the degree of sophistication of the instrumentation. If duplication of the field conditions of pressure are desired, special device-construction considerations must be taken into account. Under normal conditions of pressure (1 atm) no special construction considerations are required, and this type of construction is most widely used by testing laboratories.

As implied above, one of the shortcomings of the cold-finger test is its duration, which is highly variable. This leads to conclusions about the nature of the deposits that are not justified based on the differences of shear and residence duration of field fluids versus those of the device. An additional complication arises when attempts are made to quantify the deposits produced. Reproducible recovery of the deposits from the probes, when run under the same conditions, is difficult and often leads to loss, as the time it takes to recover the deposit from the cold finger varies while the temperatures increases. Thus, the cold finger method is generally only semi-quantitative.

EXAMPLE 8

Combination Acid/Hydraulic Fracturing Well Treatment On An Offshore Oil and Gas Platform A combination acid/hydraulic fracturing treatment was used to treat an offshore oil and gas well. The combination acid/hydraulic fracturing treatment described in this example is typical of formulations used in the industry. The introduced fluids were produced back and the resultant sludge/emulsion was treated by injecting an iron control agent comprising thioglycolic acid and an emulsion breaker comprising a mixture of DDBSA and NAXSA. The emulsion was resolved to yield a crude oil phase containing a measured BS&W ranging from 0.2% to 0.8% with an average BS&W of 0.4%.

The water phase was transferred to a process vessel and treated with a water clarifier consisting of polyacylic acid and the resultant water was treated with a macroreticular resin and discharged overboard into the ocean at a measured total oil and grease level ranging from about 1 ppm to about 15 ppm with an average of 7 ppm. A total water volume of 25,200 gallons was processed using this invention.

A total hydrocarbon volume of 3,444 gallons was processed and transferred to the sales pipeline. After the introduced fluids were processed and the well returned to normal production the produced fluids were switched back into the normal oil treating system on the platform.

The Frac Fluid stages contained a total of 65,550 lbs of 20/40 synthetic proppant which was left in the formation fracture. The following table shows the chemical additives that were used in the hydraulic fracturing fluid.

TABLE 1

Hydraulic Fracturing Fluid Composition

| Stage | Volume | Components |
|---|---|---|
| Stage 1, Pickle Acid | 210 gal | 0.4% corrosion inhibitor, acetylenic alcohol based |
| Stage 2, HCl Soak | 1200 gal | 50 ppt iron control product |
| | | 25 ppt iron control activator |
| | | 5% solvent |
| | | 0.4% corrosion inhibitor, acetylenic alcohol based |
| | | 0.2% surface tension reducer, non-ionic surfactant |
| Stage 2, Minifrac Fluid | 6,300 gal | 667.2 ppt KCl |
| | | 10.94 gpt gelling agent |
| | | 0.3 ppt bactericide, isothiazolin |
| | | 0.2% clay stabilizer, low molecular weight polyamine |
| | | 0.2% surface tension reducer, |
| | | 0.1% buffer/pH control |
| | | 0.1% enzyme-based gel breaker |
| | | 0.1% gel crosslinker, borate-based |
| Stage 3, Frac Fluid | 4,410 gal | same as Minifrac above with no crosslinker |
| Stage 4, Frac Fluid | 12,000 gal | same as Minifrac |
| Stage 5, Frac Fluid | 13,975 gal | same as Minifrac |
| Stage 6, Frac Fluid | 3,701 gal | same as Minifrac |

Abbreviations:
ppt - lbs per thousand gallons
gpt - gallons per thousand gallons

What is claimed is:

1. A method for treating a sludge/emulsion formed as a result of treating oil and gas wells with introduced fluids, comprising:
adding one or more adjunct chemicals in combination with an emulsion breaker to the sludge/emulsion, wherein the emulsion breaker is added to the sludge/emulsion in an amount sufficient to separate the sludge/emulsion into water and oil;
treating said water with a water clarifier; and
subjecting said water with a water clarifier to a separation process comprising prefiltering said water and passing said water through a resin media.

2. A method according to claim 1, wherein the adjunct chemicals are selected from a group consisting of iron-control chemicals, scale-control chemicals, and paraffin-control chemicals.

3. A method according to claim 2, wherein the iron-control chemicals are selected from a group consisting of thioglycolic acid, sodium ethylenediaminetetraacetic acid, potassium ethylenediaminetetraacetic acid, sodium hydroxyethylethylenediaminetetraacetic acid, potassium hydroxyethylethylenediaminetetraacetic acid, sodium nitrilotriacetic acid, potassium nitrilotriacetic acid, sodium bisulfite, ammonium bisulfite, and potassium bisulfite.

4. A method according to claim 2, wherein the scale-control chemicals comprise organic phosphonates.

5. A method according to claim 2, wherein the scale-control chemicals are selected from a group consisting of hydroxyethylidienediphosphonic acid, aminotri (methylenephosphonic) acid, phosphonobutanetricarboxylic acid, phosphonic acid derivatives of polyamines, organic phosphate esters, copolymers containing phosphino groups, polyacrylic acid, copolymers of polyacrylic acid with sulfonated maleic acid and copolymers of polyacrylic acid with sulfonated comonomers.

6. A method according to claim 2, wherein the paraffin-control chemicals are selected from a group consisting of ethylenevinylacetate copolymers, styrene maleic anhydride copolymers, polyacrylic esters of C20 alcohol, dodecylbenzylsulfonic acid, dialkylbenzylsulfonic acid polyoxyalkylenealkylphenolformaldehyde resins, alkyl acrylates, alkyl methacrylates, alkyl esters, and polyoxyalkylene copolymers.

7. A method according to claim 1, wherein the resin media comprises a macroreticular resin.

8. A process for treating sludge/emulsion formed by treating oil or gas wells with introduced fluids, comprising:
adding one or more iron-control chemicals to the sludge/emulsion in an amount sufficient to prevent oxidation of ferrous iron to ferric iron, one or more scale control chemicals in an amount sufficient to prevent scale formation, and/or one or more paraffin-control chemicals in an amount sufficient to prevent paraffin formation;
adding a water-dispersible emulsion breaker to the sludge/emulsion in an amount sufficient to separate the sludge/emulsion into water and oil;
treating said water with a water clarifier; and
subjecting said water with a water clarifier to a separation process comprising prefiltering said water and passing said water through a resin media.

9. A process according to claim 8, wherein said one or more iron-control chemicals comprise thioglycolic acid, sodium ethylenediaminetetraacetic acid, potassium ethylenediaminetetraacetic acid, sodium hydroxyethylethylenediaminetetraacetic acid, potassium hydroxyethylethylenediaminetetraacetic acid, sodium nitrilotriacetic acid, potassium nitrilotriacetic acid, sodium bisulfite, ammonium bisulfite, or potassium bisulfite.

10. A process according to claim 8, wherein the scale-control chemicals comprise organic phosphonates.

11. A process according to claim 8, wherein the scale-control chemicals comprise hydroxyethylidienediphosphonic acid, aminotri(methylenephosphonic acid), phosphonobutanetricarboxylic acid, phosphonic acid derivatives of polyamines, organic phosphate esters, copolymers containing phosphino groups, polyacrylic acid, copolymers of polyacrylic acid with sulfonated maleic acid and copolymers of polyacrylic acid with sulfonated comonomers.

12. A process according to claim 8, wherein the paraffin-control chemicals comprise ethylenevinylacetate copolymers, styrene maleic anhydride copolymers, polyacrylic esters of C20 alcohol, dodecylbenzylsulfonic acid, dialkylbenzylsulfonic acid, polyoxyalkylenealkylphenolformaldehyde resins, alkyl acrylates, alkyl methacrylates, alkyl esters, or polyoxyalkylene copolymers.

13. A process according to claim 8, wherein the water clarifier is added to the water in an amount sufficient to clarify the water to a purity of less than about 29 mg/L organic material.

14. A process according to claim 8, wherein the resin media comprises a macroreticular resin media.

15. A process according to claim 8, wherein the scale-control chemicals comprise copolymers containing phosphinol groups.

16. A process according to claim 8, wherein the paraffin-control chemicals comprise ethylenevinylacetate copolymers.

17. A process according to claim 8, wherein the paraffin-control chemicals comprise ethylenevinylacetate copolymers, styrene maleic anhydride copolymers, polyacrylic esters of C20 alcohol, dodecylbenzylsulfonic acid, dialkylbenzylsulfonic acid, polyoxyalkylenealkylphenolformaldehyde resins, or polyoxyalkylene copolymers.

18. A method for treating an emulsion produced by an oil or gas well that has been treated with introduced fluids, comprising:
combining one or more emulsion breakers, one or more iron-control chemicals, one or more scale-control chemicals, and one or more paraffin-control chemicals to form a combination;
adding the combination to the emulsion in an amount sufficient to separate the emulsion into water and oil;
treating the water with a water clarifier; and
subjecting the water with a water clarifier to a separation process comprising prefiltering the water and passing the water through a resin media.

19. A method according to claim 18, wherein the emulsion treated is proximate to a subterranean formation.

20. A method according claim 18, wherein the emulsion is water dispersible.

21. A method according to claim 18, wherein the iron-control chemicals comprise chelating agents.

22. A method according to claim 21, wherein the chelating agents comprise sodium or potassium salts of ethylenediaminetetraacetic acid, sodium or potassium salts of hydroxyethylethylenediaminetetraacetic acid, or sodium or potassium salts of nitrilotriacetic acid.

23. A method according to claim 18, wherein the iron-control chemicals comprise iron-reducing agents.

24. A method according to claim 23, wherein the iron-reducing agents comprise salts containing bisulfite ion.

25. A method according to claim 23, wherein the iron-reducing agents comprise thioglycolic acid.

26. A method according to claim 18, wherein the emulsion breakers comprise dodecylbenzylsulfonic acid, the sodium salt of xylenesulfonic acid, alkyoxylated compounds, anionic cationic and nonionic surfactants, and resins.

27. A method according to claim 18, wherein said resin media comprises a macroreticular resin.

28. A method according to claim 18, wherein the water clarifier comprises organic polymers.

29. A method according to claim 28, wherein the organic polymers comprise polyacrylic acid, acrylic acid based polymers, acrylamide based polymers, polymerized amines, alkanolamines, thiocarbamates or cationic polymers.

30. A method according to claim 18, wherein the water clarifier comprises inorganic metal salts.

31. A method according to claim 30, wherein the inorganic metal salts comprises alum, aluminum chloride, or aluminum chlorohydrate.

32. A method according to claim 18, wherein the scale-control chemicals comprise organic phosphonates.

33. A method according to claim 18, wherein the scale-control chemicals comprise hydroxyethylidienediphosphonic acid, aminotri(methylenephosphonic acid), phosphonobutanetricarboxylic acid, phosphonic acid derivatives of polyamines, organic phosphate esters, copolymers containing phosphino groups, polyacrylic acid, copolymers of polyacrylic acid with sulfonated maleic acid and copolymers of polyacrylic acid with sulfonated comonomers.

34. A method according to claim 18, wherein the paraffin-control chemicals comprise ethylenevinylacetate copolymers, styrene maleic anhydride copolymers, polyacrylic esters of C20 alcohol, dodecylbenzylsulfonic acid, dialkylbenzylsulfonic acid, polyoxyalkylenealkylphenol-formaldehyde resins, alkyl acrylates, alkyl methacrylates, alkyl esters, or polyoxyalkylene copolymers.

35. A method for resolving a sludge/emulsion formed as a result of treating an oil and gas well with introduced fluids, comprising separating the sludge/emulsion into an oil phase and a water phase by:
injecting an iron control agent comprising thioglycolic acid; and
injecting an emulsion breaker comprising a DDBSA and NAXSA;
transferring the water phase to a process vessel;
treating the water phase with a water clarifier comprising polyacrylic acid to form a clarified water solution; and
treating the clarified water solution with a macroreticular resin.

* * * * *